United States Patent [19]

Nishizawa et al.

[11] E Patent Number: Re. 33,627

[45] Reissued Date of Patent: Jul. 2, 1991

[54] VARIABLE RESISTOR

[75] Inventors: Hideo Nishizawa; Yukinori Ueda, both of Fukui, Japan

[73] Assignee: Murata Manufacturing Co., Ltd., Japan

[21] Appl. No.: 350,943

[22] Filed: May 12, 1989

Related U.S. Patent Documents

Reissue of:

[64] Patent No.: 4,785,278
Issued: Nov. 15, 1988
Appl. No.: 102,321
Filed: Sep. 29, 1987

[30] Foreign Application Priority Data

Oct. 1, 1986 [JP] Japan ..... 61-235125

[51] Int. Cl.[5] ..... H01C 10/32

[52] U.S. Cl. ..... 338/162; 338/171

[58] Field of Search ..... 338/160, 162, 163, 164, 338/171, 174, 184, 167, 188, 199, 190

[56] References Cited

U.S. PATENT DOCUMENTS 4,721,940 1/1988 Otani ..... 338/163
4,736,184 4/1988 Arrigzu ..... 338/162

*Primary Examiner*—C. L. Albritton
*Attorney, Agent, or Firm*—Ostrolenk, Faber, Gerb & Soffen

[57] ABSTRACT

A variable resistor wherein the arm portion of a rotatable slider is in contact against an approximately circular arc-shaped resistor provided on a base plate with the central portion of the resistor, and the slider is provided with a driver plate having an approximately dish-shaped projection portion at its center, and an approximately ring-shaped arm portion having a contact portion, which are coupled to each other, are punched out from one sheet of conductive sheet metal, are turned up by 180° at the coupling portion, with the projection portion being projected from the arm portion.

4 Claims, 5 Drawing Sheets

PRIOR
ART

VARIABLE RESISTOR

Matter enclosed in heavy brackets [ ] appears in the original patent but forms no part of this reissue specification; matter printed in italics indicates the additions made by reissue.

BACKGROUND OF THE INVENTION

The present invention relates to a variable resistor with a slider, and more particularly, to the shape of its slider.

Conventionally, there has been proposed, for instance, a variable resistor shown in FIG. 7 through FIG. 9, wherein an approximately circular arc-shaped resistor 2 corresponding to the portions of dotted lines in FIG. 7 is provided on the base plate 1, the cylindrical portion 8a of a terminal 8 positioned in a central hole 1a of the base plate 1 is caulked so that a slider 3 is rotated mounted on the base plate 1. The slider 3 has a projection 4a of an arm portion 4 formed in a circular arc shape in one portion of the outer periphery contacted against the resistor 2, and has a groove portion 5 which is adjustable to move by a minus driver. Also, outer electrodes 2a, 2a are respectively connected with both ends of the resistor 2.

However, this has a problem that the deformation of the arm portion 4 is likely to occur through the application of an outer force at the engagement with counterpart such as a circuit base plate or in the adjustment of the slider, thus causing inferior contact of the projection 4a, because there is nothing to guard the arm portion 4. In addition, there is a problem about the reliability of press being low with respect to the slider 3 since an area to be sucked by a chip-pressor is relatively small.

As to another example, a variable resistor has also been known, as shown in FIG. 10 through FIG. 12, wherein a rotor 6 retained on the cylindrical portion 8a of the terminal 8 is rotatably disposed integrally with the slider 3. It is to be noted that in FIG. 10 through FIG. 12 the same reference numerals are given to the same parts as those of the conventional variable resistor of FIG. 7 through FIG. 9. This variable resistor has advantages that the deformation of the arm portion 4 is rarely to occur because the arm portion 4 is guarded by the rotor 6, and the adjustment is easier to perform because the groove 7 formed in the rotor 6 is adjustable by the pulse driver. However, this variable resistor has new problems that the height of this variable resistor is increased by the portion of the rotor 6 provided, and furthermore the number of the parts increases to make it difficult to position the rotor 6, with a new problem that the cost is absolutely increased on the whole, thus causing the increase of the cost on the whole.

SUMMARY OF THE INVENTION

Accordingly, an object of the present invention is to provide a variable resistor which can eliminate the disadvantages inherent in the conventional ones, and wherein a slider is provided with a driver plate having an approximately dish-shaped projection portion at is center and an approximately ring-shaped arm portion having a contact portion, which are coupled to each other, are punched out from one sheet of conductive sheet metal, are turned up by 180° at the coupling portion, to project the projection portion from the arm portion.

With the above-described construction in the variable resistor of the present invention, the slider is rotatably retained on a base plate by the dish-shaped projection portion of the driver plate, which is located outwardly of the arm portion, so that the possibility of the arm portion being deformed through the application of the outer force thereon can be removed. Also, the height of the variable resistor is low because the driver plate portion and the arm portion are turned up to be lapped, and the conventional rotor is not used. In addition, as the driver plate is independent of the arm portion, the groove portion for plus driver use may be formed, while, as the arm portion becomes about two times as long as the conventional one, the spring characteristics are improved, the contact point pressure against the resistor is stable and the reliability of the resistor is higher than the conventional one.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED INVENTION

Figure 13:
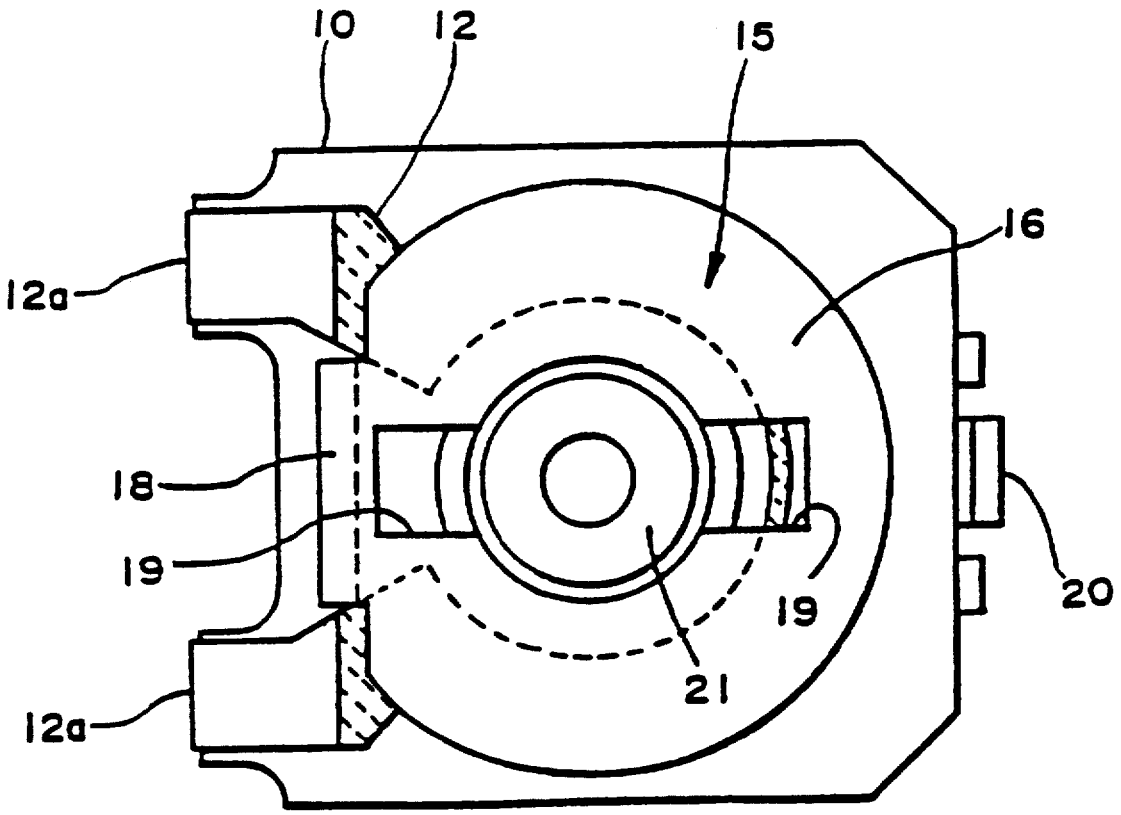
*FIG. 13 is a plan view of a variable resistor in accordance with another preferred embodiment of the present invention which differs from the embodiment of FIG. 1 in the inclusion therein of a groove which is adapted for a minus driver.*
Figure 10:
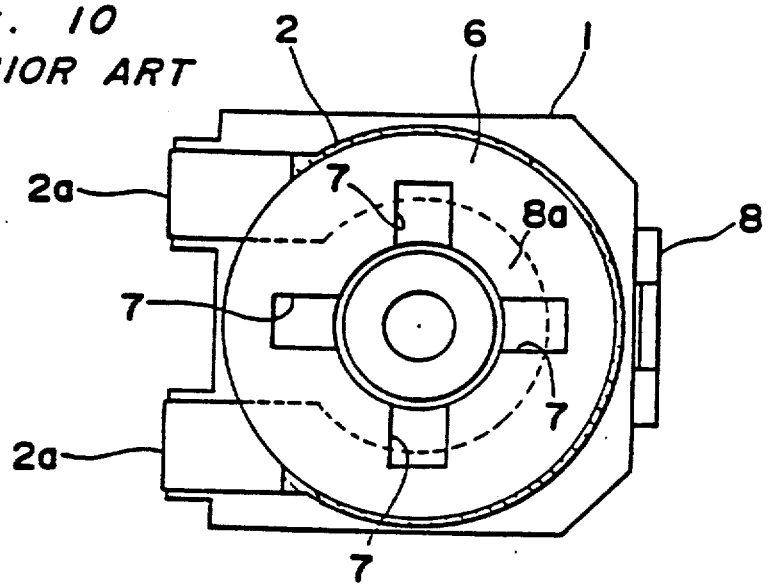
Fig. 10 PRIOR ART
FIG. 10 is a plan view showing another conventional variable resistor (already referred to)
Figure 11:
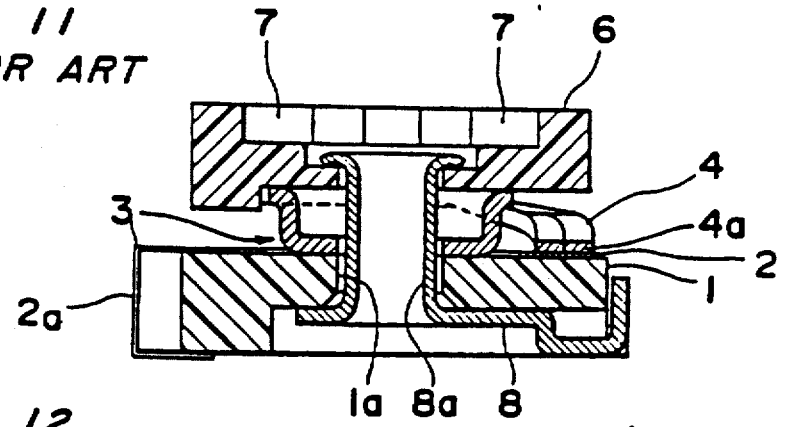
Fig. 11 PRIOR ART
FIG. 11 is a cross-sectional view of FIG. 10.
Figure 12:
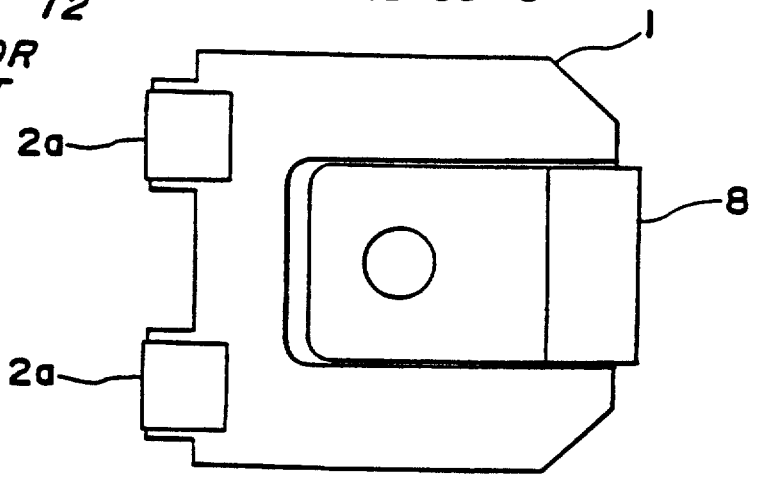
FIG. 12 is a bottom view of FIG. 10.
Figure 7:
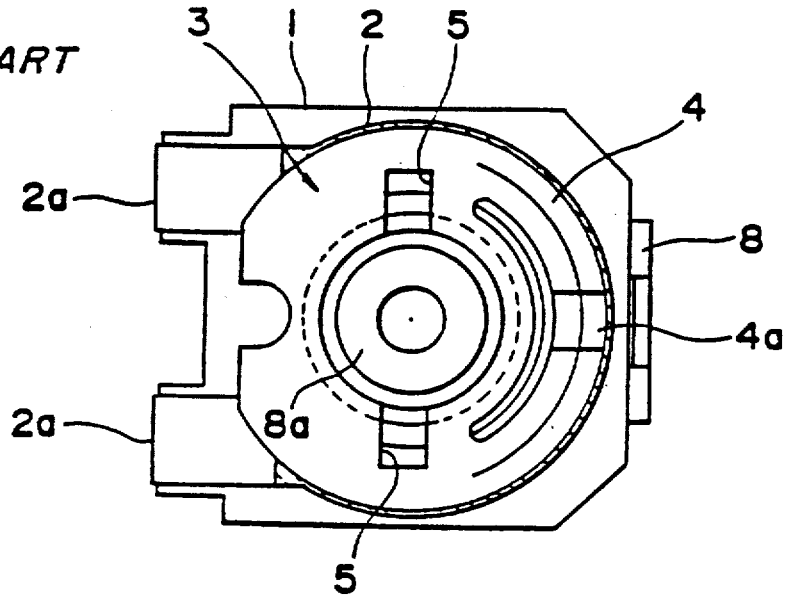
Fig. 7 PRIOR ART
FIG. 7 is a plan view showing one conventional variable resistor (already referred to)
Figure 8:
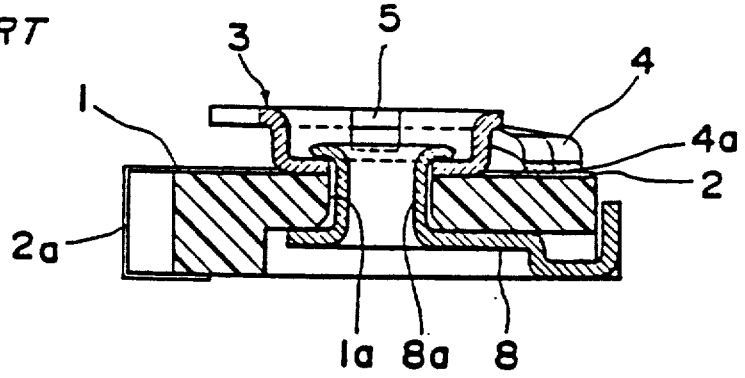
Fig. 8 PRIOR ART
FIG. 8 is a cross-sectinal view of FIG. 7.
Figure 9:
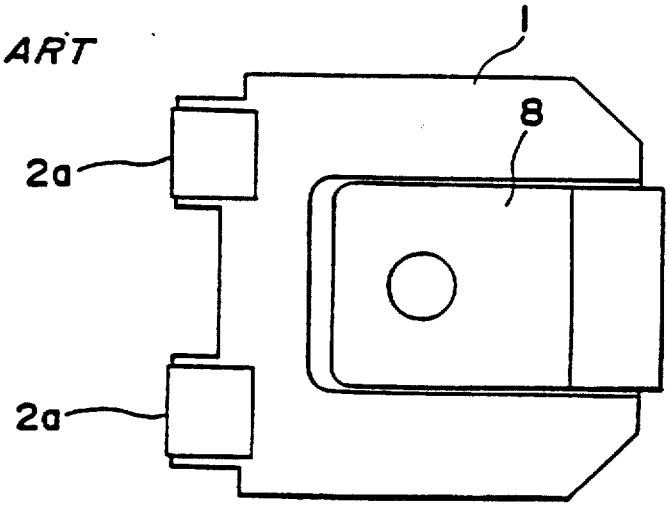
Fig. 9 PRIOR ART
FIG. 9 is a bottom view of FIG. 7.
Figure 4:
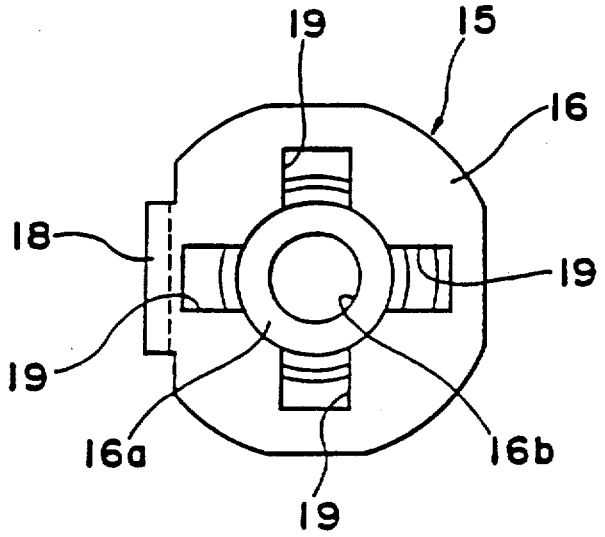
FIG. 4 is a plan view of a slider to be assembled into the variable resistor of FIG. 1.

Before the description of the present invention proceeds, it is to be noted that like parts are designated by like reference numerals throughout the accompanying drawings.

Referring to FIGS. 1 through 6, there is shown a variable resistor according to a preferred embodiment of the present invention, which is composed of a base plate 10 having a resistor 12, a slider 15 and a terminal plate 20. The resistor 12 is disposed in approximately circular arc-shaped around a center hole 11 of the base plate 10 as shown in the dotted line of FIG. 1 in a known manner, with external electrodes 12a, 12a formed across the reverse face from the side face of the base plate 10 being connected with both ends of the resistor 12.

Figure 5:
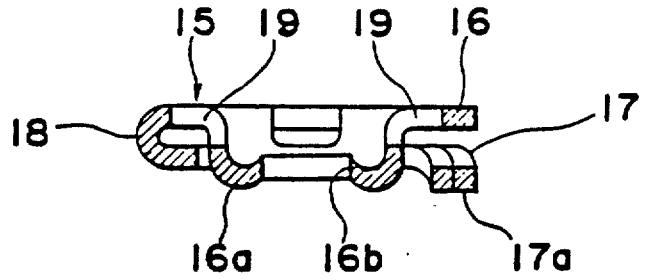
FIG. 5 is a cross-sectional view of FIG. 4.
Figure 6:
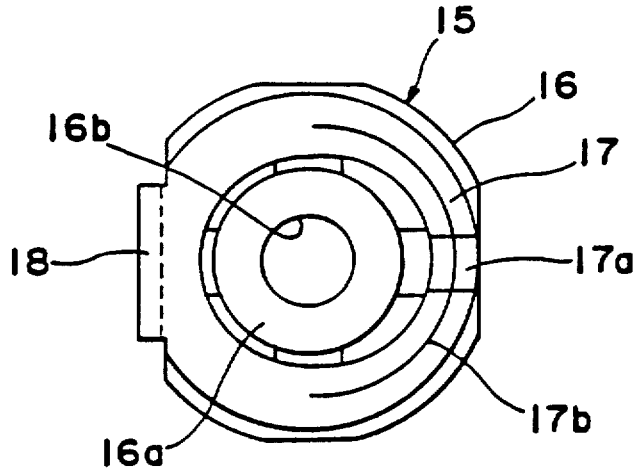
FIG. 6 is a bottom view of FIG. 4.
Figure 1:
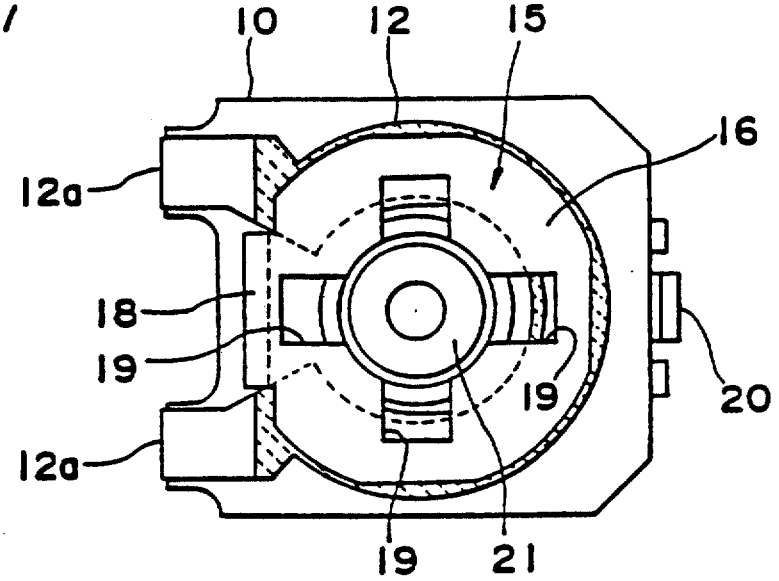
FIG. 1 is a plane view of a variable resistor in accordance with a preferred embodiment of the present invention.
Figure 2:
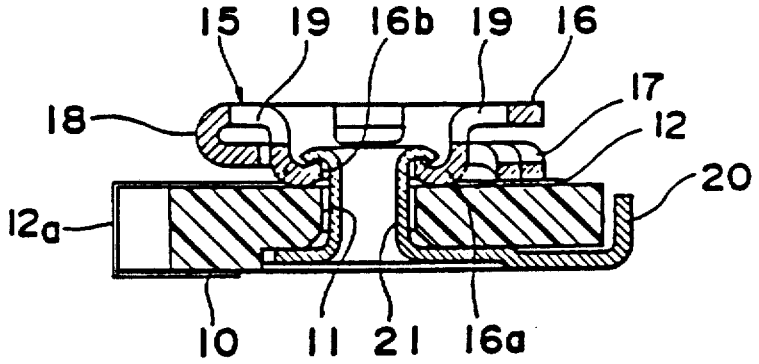
FIG. 2 is a cross-sectional view of FIG. 1.
Figure 3:
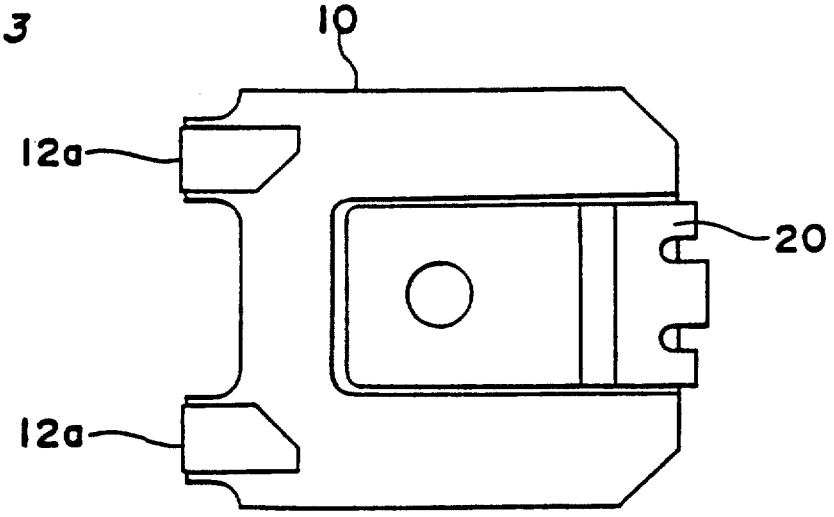
FIG. 3 is a bottom view of FIG. 1.

The slider 15 has at its one end a driver plate portion 16 and at its other end an arm portion 17 turned up to be lapped onto the driver plate portion to form a lying U-shape as shown in FIG. 5. In other words, the slider 15 is manufactured in such a manner that the driver plate 16 having an approximately dish-shaped projection portion 16a at its central portion, the approximately ring-shaped arm portion 17 having a projected point of contact 17a, which are originally coupled to each other at both of their corresponding ends to form a coupling portion 18, are punched out from one piece of conductive sheet metal and are turned up by 180° at the coupling portion 18 with the projection portion 16a being downwardly projected from the arm portion 17. The driver plate 16 is somewhat larger in outer diameter than the arm portion, with a groove portion 19 adjustable with a plus driver (not shown) to move the slider 15 being formed in the driver plate 16. Also, a slit 17b is formed at the center of the arm portion 17 in the circular direction around the contact point portion 17a so that two-point contacts where the contact resistance variation thereof is small with respect to the resistor 12 is provided to be retained upon the base plate 10.

The slider 15 composed of the above construction is retained rotatably on the base plate 10 in a concentric circle with the resistor 12, with the cylindrical portion 21 of the terminal plate 20 inserted through the hole 11 of the base plate 10 being engaged into the hole 16b of the projection 16a of the driver plate 16 for caulking operation. By means of caulking the cylindrical portion 21 of the terminal plate 20, the slider 15 is rotatably mounted unassembled on the base plate 10. At this time, the contact point portion 17a comes into contact on the resistor 12 with proper spring pressure not only through the elastic force of the arm portion 17, but also through the elastic force of a coupling portion 18 or the like.

As is clear from the foregoing description, according to the arrangement of the embodiment of the present invention, the slider is provided with the driver plate having the approximately dish-shaped projection portion at its center, and the approximately ring-shaped arm portion having a contact point portion, which are coupled to each other at the coupling portion, are punched out from one piece of conductive sheet metal and are turned up by 180° at the coupling portion with the projection portion being projected from an arm portion, so as to guard the arm portion with the driver plate being positioned outwardly of the arm portion, the possibility of the arm portion being deformed during the engagement or the adjustment may be, needless to say, removed, the plus groove portion may be formed with tolerance in the driver plate portion for easier adjustment in spite of thin type of unrequired rotor. In addition, the number of items to be assembled into the variable resistor is smaller, the assembling is easier to perform, the manufacturing is lower in cost as compared with the rotor attached in the convention one. Also, as the arm portion of the slider becomes about two times as long as the conventional one, the spring characteristics are improved to stabilize the contact point pressure against the resistor, thus improving the reliability of the resistor. Furthermore, the reliability of the press becomes improved with respect to the driver plate due to having enough area to be sucked by a chip-pressor. It is to be noted that the area to be sucked by the chip-pressor becomes large in the case of forming a groove for a minus driver on the driver plate, *as shown in FIG. 13,* in comparison with the case of forming a groove for a plus driver.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A variable resistor comprising a base plate having a hole at its center and a resistor around the hole, a slider provided with, at its one end, a driver plate having an approximately dish-shaped projection at its center, and an approximately ring-shaped arm portion having a contact point portion, which are coupled to each other at a coupling portion of the both ends, are punched out from one piece of conductive sheet metal and are turned up by 180° at the coupling portion with the projection portion being projected from an arm portion, and a terminal plate having a cylindrical portion inserted through the hole of the base plate and engaged into the hole of the projection portion of the driver plate, the driver plate being rotatably mounted onto the base plate through the terminal plate.

2. The variable resistor as claimed in claim 1, wherein the driver plate is positioned extendingly to the outside of the arm portion in order to protect the arm portion.

3. The variable resistor as claimed in claim 1, wherein the driver plate is provided with a groove to use for a plus driver.

4. The variable resistor as claimed in claim 1, wherein the driver plate is provided with a groove to use for a minus driver.

* * * * *